US009893533B2

(12) United States Patent
Kitaji

(10) Patent No.: US 9,893,533 B2
(45) Date of Patent: Feb. 13, 2018

(54) SERVER APPARATUS, ELECTRICAL POWER CONTROL APPARATUS, AND ELECTRICAL POWER CONTROL SYSTEM

(71) Applicant: KYOCERA CORPORATION, Kyoto (JP)

(72) Inventor: Mitsuhiro Kitaji, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 528 days.

(21) Appl. No.: 14/410,856

(22) PCT Filed: Jul. 11, 2013

(86) PCT No.: PCT/JP2013/004287
§ 371 (c)(1),
(2) Date: Dec. 23, 2014

(87) PCT Pub. No.: WO2014/010245
PCT Pub. Date: Jan. 16, 2014

(65) Prior Publication Data
US 2015/0200544 A1 Jul. 16, 2015

(30) Foreign Application Priority Data
Jul. 11, 2012 (JP) ................. 2012-156022

(51) Int. Cl.
G05D 3/12 (2006.01)
H02J 4/00 (2006.01)
(Continued)

(52) U.S. Cl.
CPC ............... *H02J 4/00* (2013.01); *G05B 15/02* (2013.01); *H02J 3/14* (2013.01); *H02J 13/0079* (2013.01);
(Continued)

(58) Field of Classification Search
None
See application file for complete search history.

(56) References Cited

U.S. PATENT DOCUMENTS 3,872,286 A * 3/1975 Putman .................. G06Q 50/06
307/52
4,181,950 A * 1/1980 Carter, II ........... G01R 21/1333
307/35

(Continued)

FOREIGN PATENT DOCUMENTS

JP S59-59528 A 4/1984
JP 2007-202361 A 8/2007

(Continued)

OTHER PUBLICATIONS

Extended European Search Report dated Mar. 7, 2016 issued by the European Patent Office for Counterpart European Application No. EP 13 81 6909.

(Continued)

Primary Examiner — Philip Wang
(74) Attorney, Agent, or Firm — Procopio Cory Hargreaves and Savitch LLP

(57) ABSTRACT

An EMS server (14) calculates an estimated value of an integrated power consumption at an expiration of a reference time, based on a current value of power consumption of at least one load device located in a consumer's facility and a remaining time in the reference time. The EMS server (14) controls the load device in accordance with the estimated value of the integrated power consumption and a response time. The response time refers to a time required to complete a change in power consumption of the load device in response to a change in a setting of the load device.

9 Claims, 5 Drawing Sheets

(51) Int. Cl.
*H02J 3/14* (2006.01)
*H02J 13/00* (2006.01)
*G05B 15/02* (2006.01)

(52) U.S. Cl.
CPC ..... *H02J 2003/143* (2013.01); *Y02B 70/3225* (2013.01); *Y02B 70/3266* (2013.01); *Y04S 20/222* (2013.01); *Y04S 20/242* (2013.01)

(56) References Cited

U.S. PATENT DOCUMENTS

| | | | |
|---|---|---|---|
| 8,185,753 B2* | 5/2012 | Oe | G06F 1/28 700/286 |
| 2008/0219544 A1 | 9/2008 | Tasaki et al. | |
| 2008/0281473 A1* | 11/2008 | Pitt | G06Q 30/02 700/291 |
| 2009/0018705 A1* | 1/2009 | Ouchi | H02J 3/14 700/291 |
| 2013/0345888 A1* | 12/2013 | Forbes, Jr. | H02J 3/14 700/291 |
| 2015/0076926 A1* | 3/2015 | Kosaka | H02J 3/14 307/126 |

FOREIGN PATENT DOCUMENTS

| | | |
|---|---|---|
| JP | 2007-336180 A | 12/2007 |
| JP | 2009-116842 A | 5/2009 |
| JP | 2009-260913 A | 11/2009 |

OTHER PUBLICATIONS

International Search Report; PCT/JP2013/004287; dated Aug. 6, 2013.
Written Opinion of the International Searching Authority; PCT/JP2013/004287; dated Aug. 6, 2013; with concise explanation.
Office Action dated Sep. 29, 2015, issued in counterpart Japanese application No. 2012-156022.

* cited by examiner

SERVER APPARATUS, ELECTRICAL POWER CONTROL APPARATUS, AND ELECTRICAL POWER CONTROL SYSTEM

CROSS-REFERENCE TO RELATED APPLICATION

This application claims priority to and the benefit of Japanese Patent Application No. 2012-156022 filed on Jul. 11, 2012, the entire contents of which are incorporated herein by reference.

TECHNICAL FIELD

The present invention relates to a server apparatus, an electrical power control apparatus (hereinafter, simply called "power control apparatus"), and an electrical power control system (hereinafter, simply called "power control system") all of which are capable of controlling load devices.

BACKGROUND

In recent years, several technologies have been proposed to control a variety of devices from remote sites via the Internet. (Refer to Patent Literature 1.) Such control over the devices via the network such as the Internet requires assignment of a unique identification number, such as a global IP address, to each of the controlled devices in order to allow the server to directly control the devices. Since the number of unique identification numbers assigned to the controlled devices is finite, available unique identification numbers would be exhausted once all the controlled devices are each assigned with a unique identification number.

To address this, a technology has been proposed for controlling devices via a network such as the Internet. (Refer to Patent Literature 2.) In the proposed technology, a local controller accesses a server to retrieve control instructions from the server and controls the devices in accordance with the retrieved control instructions. This configuration, in which the local controller controls the devices by acquiring the control instructions through polling, eliminates the need for assignment of a unique identification number to each device.

CITATION LIST

Patent Literature

Patent Literature 1: Japanese Patent Application Publication No. 2007-336180
Patent Literature 2: Japanese Patent Application Publication No. 2009-260913

SUMMARY OF INVENTION

Technical Problem

Studies have been conducted to control power consumption of load devices by applying the aforementioned device control via a network to control over load devices in different commercial facilities. This, for example, allows a single server to collectively control the load devices located in different stores operated by a company.

Power used in commercial facilities is supplied from a power seller, and transaction of the power is based on a contract demand. The contract demand refers to a mean value of power that a consumer is allowed to consume per demand time limit such as 30 minutes. Accordingly, the company, which receives power under such a power transaction contract, seeks to control the load devices to regulate the mean value of power that is actually consumed per demand time limit below a planned power consumption such as the contract demand.

In view of the above circumstance, an objective of the present invention is to provide a server apparatus, a power control apparatus, and a power control system all of which are capable of controlling load devices to regulate the mean value of actual power consumption per demand time limit below a planned power consumption.

Solution to Problem

In order to solve the aforementioned problem, a first aspect of the present invention resides in a server apparatus configured to control at least one load device located in a consumer's facility in accordance with (i) an estimated value of an integrated power consumption at an expiration of a reference time that the consumer and an electric company use in calculation of power charges, the estimated value of the integrated power consumption being calculated based on a current value of power consumption of the at least one load device and a remaining time in the reference time, and (ii) a response time required to complete a change in power consumption of the at least one load device in response to a change in a setting of the at least one load device.

A second aspect of the present invention resides in the server apparatus, wherein, preferably, the at least one load device includes a plurality of load devices, and the server is further configured to: calculate, for each of the plurality of load devices, an amount of reduction in the estimated value at the expiration of the reference time that is caused by the change in the setting of the load device, based on the remaining time in the reference time and the response time; and generate at least one control instruction to make the change in the setting of at least one of the plurality of the load devices for reducing the estimated value to below a planned value.

A third aspect of the present invention resides in the server apparatus, wherein, preferably, the at least one control instruction includes a plurality of control instructions generated for at least some of the plurality of load devices, and the server apparatus is further configured to generate a set of the plurality of control instructions and the at least some of the plurality of load devices for reducing the estimated value to below the planned value.

A fourth aspect of the present invention resides in the server apparatus, wherein, preferably, the at least one load device includes a plurality of load devices each having a predetermined response time and a predetermined threshold value depending on the predetermined response time, and the server is further configured, when the estimated value of any of the plurality of load devices is greater than the corresponding predetermined threshold value, to generate a control instruction to reduce power consumption of the any of the plurality of load devices.

A fifth aspect of the present invention resides in the server apparatus, wherein, preferably, as a difference between the estimated value and the threshold value increases, the server apparatus generates the control instruction providing a greater effect of reducing power consumption.

A sixth aspect of the present invention resides in the server apparatus, preferably further configured to store an actual response time required to complete the change in power consumption of the any of the plurality of load devices after the change in the setting is made to the any of the plurality of load devices in response to the control instruction and to adjust the threshold value in accordance with a difference between the actual response time and the predetermined response time.

A seventh aspect of the present invention resides in a power control apparatus configured to control at least one load device located in a consumer's facility in accordance with (i) an estimated value of an integrated power consumption at an expiration of a reference time that the consumer and an electric company use in calculation of power charges, the estimated value of the integrated power consumption being calculated based on a current value of power consumption of the at least one load device and a remaining time in the reference time, and (ii) a response time required to complete a change in power consumption of the at least one load device in response to a change in a setting of the at least one load device.

An eighth aspect of the present invention resides in the power control apparatus, preferably further configured to (i) transmit, to a server, the current value of power consumption of the at least one load device, (ii) receives, from the server, a control instruction to the at least one load device generated in accordance with the estimated value, which is calculated based on the current value of power consumption of the at least one load device and the remaining time in the reference time, and the response time, which is required to complete the change in power consumption of the at least one load device in response to the change in the setting of the at least one load device, and (iii) control the at least one load device in accordance with the received control instruction.

A ninth aspect of the present invention resides in a power control system, preferably including: a power control apparatus configured to transmit a current value of power consumption of at least one load device located in a consumer's facility and configured to control the load device; and a server apparatus configured to generate a control instruction for controlling the at least one load device in accordance with (i) an estimated value of an integrated power consumption at an expiration of a reference time that the consumer and an electric company use in calculation of power charges, the estimated value of the integrated power consumption being calculated based on the current value of power consumption and a remaining time in the reference time, and (ii) a response time required to complete a change in power consumption of the at least one load device in response to a change in a setting of the at least one load device, wherein the power control apparatus receives the control instruction from the server apparatus and controls the at least one load device in accordance with the received control instruction.

Although the solution to problem according to the preset invention has been described to include the devices and the system, the present invention may be also embodied in other forms such as a method, a program, and a storage medium storing the program substantially corresponding to the devices and the system, and these should be understood to be included in the scope of the present invention.

Advantageous Effects of Invention

The server apparatus, the power control apparatus, and the power control system with the above configurations according to the present invention are capable of controlling the load devices to regulate the mean value of power consumption per demand time limit below the planned value.

BRIEF DESCRIPTION OF DRAWINGS

The present invention will be further described below with reference to the accompanying drawings, wherein.

DESCRIPTION OF EMBODIMENTS

Embodiments of the present invention will be described below with reference to the drawings.

Figure 1:
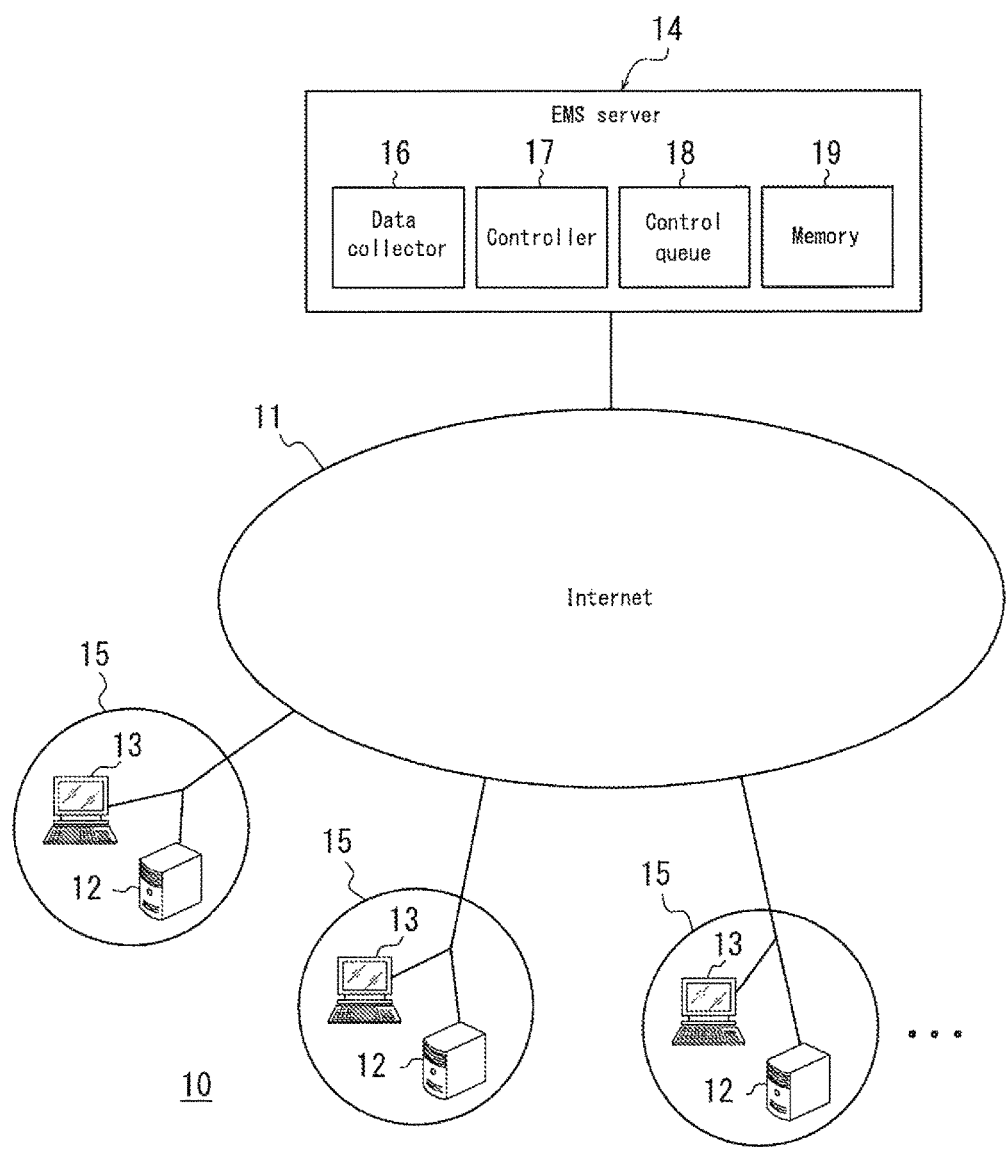
FIG. 1 is a communication system configuration diagram illustrating a schematic configuration of a power control system including a server apparatus according to a first embodiment of the present invention.

Firstly, a description is given of a power control system including a server apparatus according to the first embodiment of the present invention. FIG. 1 is a communication system configuration diagram illustrating a schematic configuration of the power control system including the server apparatus according to the first embodiment.

As illustrated in FIG. 1, a power control system 10 includes the Internet 11, a plurality of power control apparatus 12, a plurality of user terminals 13, and an Energy Management System (EMS) server 14 (hereinafter, also called "server apparatus 14").

The Internet 11 connects the plurality of power control apparatus 12, the plurality of user terminals 13, and the EMS server 14 to allow communication of signals such as data and control instructions. The power control system 10 also includes Local Area Networks (LANs) 15 defined for different stores, and each LAN 15 includes at least one power control apparatus 12 and at least one user terminal 13. The power control apparatus 12 and the user terminal 13 belonging to the same LAN 15 may be in direct communication with each other.

The power control apparatus 12 may be an EMS Gateway. The power control apparatus 12 regularly transmits measurement values indicating, for example, power consumption detected by later-described sensors to the EMS server 14. The power control apparatus 12 also acquires from the EMS server 14 at least one control instruction to at least one load device belonging to the same LAN 15 through polling. In accordance with the control instruction received from the EMS server 14, the power control apparatus 12 controls the load device belonging to the same LAN 15.

The user terminal 13 includes a display which allows display of the measurement values detected by the sensors belonging to the same LAN 15 and an operation state of the load device belonging to the same LAN 15. To display such a measurement value and a control state, the user terminal 13 acquires data from the EMS server 14 over HTTP, and a web browser of the user terminal 13 renders the acquired data into a web page displaying the measurement values. The user terminal 13 also issues a control instruction to the load device belonging to the same LAN 15. Such a control instruction is issued in response to detection of a user operation made on a device control page rendered by the web browser. The user terminal 13 transmits the issued control instruction to the EMS server 14.

The EMS server 14 receives the measurement values from the power control apparatus 12 and stores the received measurement values. The EMS server 14 also receives the control instructions issued by the user terminals 13. The EMS server 14 also generates control instructions to the load devices. The power control apparatus 12 receive the control instructions received or generated by the EMS server 14 through polling. Additionally, the EMS server 14 may also register and update information of the respective sensors belonging to the LANs 15.

The EMS server 14 includes a data collector 16, a controller 17, a control queue 18, and a memory 19. The data collector 16 collects and stores the measurement values and the registration information of the sensors. The data collector 16 regularly collects the above data and regularly updates the stored data. The controller 17 generates control instructions to the load devices by using a variety of algorithms for different purposes. The control queue 18 stores the control instructions received from the user terminals 13 and the control instructions generated by the controller 17. The memory 19 stores a variety of data that the controller 17 uses to generate the control instructions.

Figure 2:
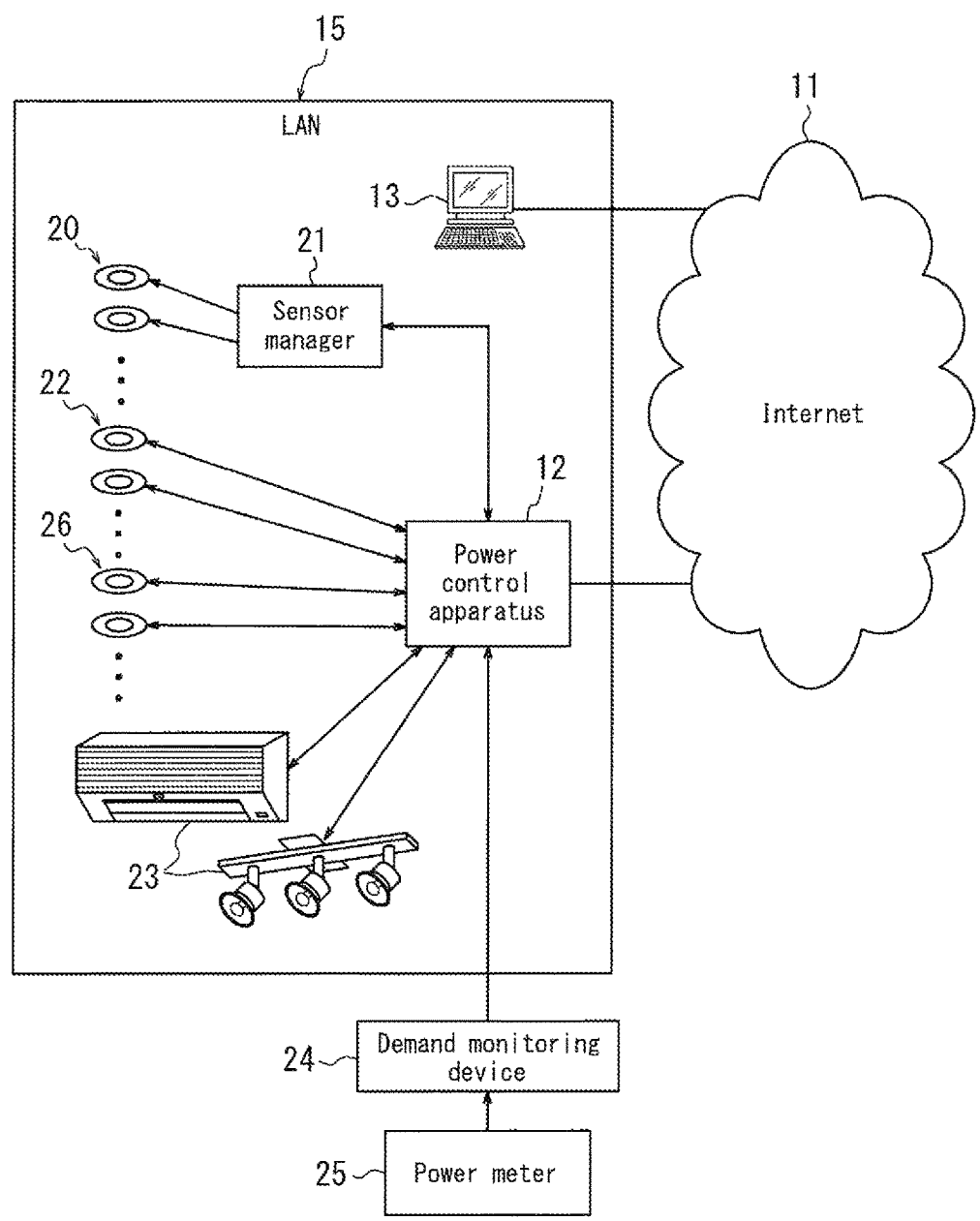
FIG. 2 is a function block diagram of devices belonging to any one of a plurality of LANs illustrated in FIG. 1.

Secondly, a description is given of transmission of the measurement values and control over the load devices by the power control apparatus 12. FIG. 2 is a function block diagram of devices belonging to any one of the plurality of LANs.

The any one of the plurality of LANs 15 includes a first sensor 20, a sensor manager 21, a second sensor 22, a third sensor 26, at least one load device 23, the power control apparatus 12, and the user terminal 13. The power control apparatus 12 connects to a power meter 25 via a demand monitoring device 24.

The first sensor 20 may be any sensor, such as a current sensor, a power sensor, a thermal sensor, and a light intensity sensor, configured to detect the measurement value concerning the operation state of the load device 23 belonging to the LAN.

The sensor manager 21 detects the measurement value from the first sensor 20. The sensor manager 21 communicates with the power control apparatus 12 by using a standard protocol, such as ZigBee™ Smart Energy Profile 2.0 (SEP 2.0) and Echonet™.

The second sensor 22 may be any sensor, such as a current sensor, a power sensor, a thermal sensor, and a light intensity sensor, configured to detect the measurement value concerning the operation state of the load device 23 belonging to the LAN 15. Unlike the first sensor 20, the second sensor 22 communicates with the power control apparatus 12 by using a unique protocol.

The third sensor 26 may be any sensor, such as a current sensor, a power sensor, a thermal sensor, and a light intensity sensor, configured to detect the measurement value concerning the operation state of the load device 23 belonging to the corresponding LAN 15. Unlike the first sensor 20 and the second sensor 22, the third sensor 26 directly communicates with the power control apparatus 12 by using a standard protocol, such as SEP 2.0 and Echonet™.

Examples of the load device 23 include electrically driven devices, such as an air conditioner, a lighting tool, and a refrigerator. Operation conditions (e.g. temperature and light intensity) of the load device 23 may be regulated, and this regulation changes power consumption of the load device 23. The load device 23 communicates with the power control apparatus 12 by using a standard protocol, such as Echonet™.

As mentioned previously, the power control apparatus 12 may communicate with the sensor manager 21, the second sensor 22, and the third sensor 26 to regularly transmit the measurement values of the first sensor 20, the second sensor 22, and the third sensor 26 to the EMS server 14 via the Internet 11. As also mentioned previously, the power control apparatus 12 acquires from the EMS server 14 the control instruction to the load device 23 belonging to the same LAN 15 through polling. In accordance with the acquired control instruction, the power control apparatus 12 controls the operation state of the load device 23.

The power control apparatus 12 also recognizes a commencement of a demand time limit (i.e., a reference time) from an output of the demand monitoring device 24. The power control apparatus 12 also acquires, from an output of the demand monitoring device 24, a current value of an integrated power consumption of all the load devices 23 (including the at least one load device 23) located in the stores in the current demand time limit.

As mentioned previously, the user terminal 13 displays the measurement values of the first sensor 20 and the second sensor 22 belonging to the same LAN 15 and displays the operation state of each load device 23. As also mentioned previously, the user terminal 13 may also directly instruct the load device 23 to set, for example, a temperature and light intensity per se.

The demand monitoring device 24 reads a pulse outputted by the power meter 25 and outputs the read pulse to the power control apparatus 12.

The power meter 25 measures the integrated power consumption of each store in the demand time limit. A demand time limit refers to the reference time used by a company (i.e., a consumer) operating stores or the like and an electric company in settlement of a contract demand. Assume a case where the demand time limit is set 30 minutes and the contract demand is set 300 kw, the company is allowed to consume an average of 300 kw of electric power per the demand time limit. The power meter 25 resets the integrated power consumption at the commencement of the demand time limit for measurement of the integrated power consumption from the commencement of the demand time limit to the present.

Now, a description is given of processing, performed by the EMS server 14, of changing settings of the load devices 23 in order to reduce the integrated power consumption in the aforementioned configuration.

The controller 17 calculates an estimated value of the integrated power consumption at an expiration of the demand time limit, based on an elapsed time from the commencement of the demand time limit and based on a current value of the integrated power consumption of the at least one load device 23 under control of an arbitrary one of the power control apparatus 12.

The calculation of the estimated value may involve use of a variety of algorithms. One way of calculation of the estimated value may consist in calculating the rate of increase in the integrated power consumption from the commencement of the demand time limit to the present and linearly increasing the current value of the integrated power consumption at the calculated rate of increase based on the remaining time in the demand time limit. An alternative way of calculation may consist in statistically calculating the estimated value from a history in the past.

When the calculated estimated value is greater than a planned value, the controller 17 generates a control instruction to the load device 23 to change the setting for reducing power consumption. The planned value may be a value set for each power control apparatus 12 by a user. For example, an amount of power corresponding to a product of the contract demand and the demand time limit may be set as the planned value.

The aforementioned calculation of the estimated value and the aforementioned comparison of the estimated value with the planned value are performed at a predetermined timing in the demand time limit, such as a half time of the demand time limit. However, the aforementioned calculation of the estimated value and the aforementioned comparison of the estimated value with the planned value do not need to be performed at the half time of the demand time limit, and they may also be performed more than once in the demand time limit. Such timing may be inputted by an operation made to the user terminal 13.

The power consumption of the load device 23 may be reduced to the expected value in response to the change made to the setting in the operation state. Different load devices 23 have varying ways of changing the settings of the operation states, and the different ways of changing the settings of the load devices 23 produce different expected values of power consumption.

The different ways of changing the settings also yield different response times required for the power consumptions of the load devices 23 to reach the expected values of power consumption. For example, a lighting tool, which may be the load device 23, changes the light intensity immediately in response to a change in the setting of the light intensity, and this also causes a change in power consumption of the load device 23 in accordance with the change in the light intensity. The change in the setting according to the above example requires a relatively short response time. On the other hand, an air conditioner, which may be the load device 23, stops the operation of a compressor immediately after a power off in response to a change in the setting to power off the air conditioner in order to improve operation efficiency. However, for a while from then, the indoor fan remains rotating. Accordingly, the change in the setting to power off the air conditioner requires a relatively long response time.

The controller 17 generates the control instruction considering the amount of reduction in power consumption of the load device 23 and the response time of the load device 23 which is to be caused by the change in the setting. In detail, the controller 17 calculates, for each way of changing the setting of each load device, the amount of reduction in the estimated value of the integrated power consumption in response to the change in the setting, based on the corresponding expected value of power consumption and the corresponding response time.

Figure 3:
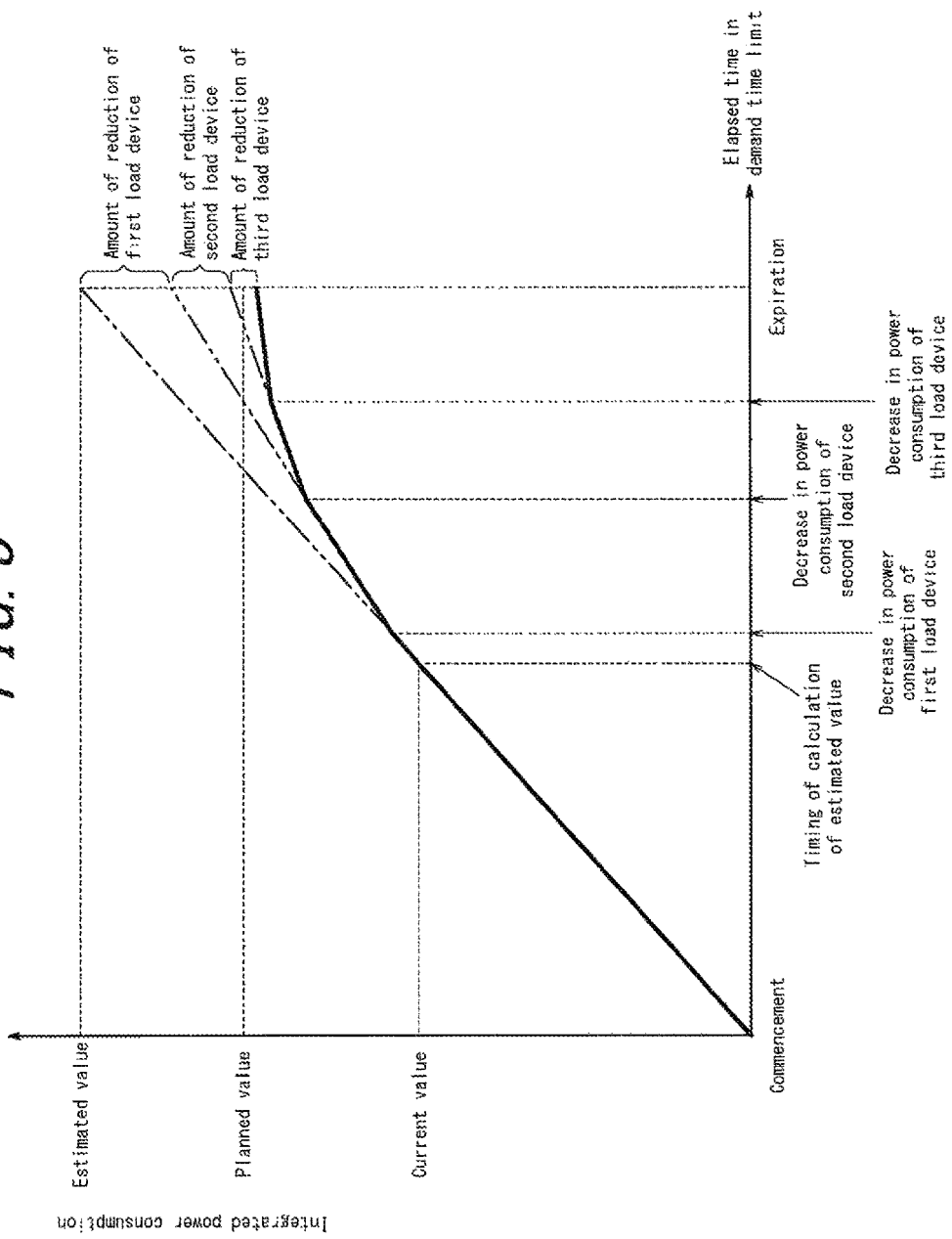
FIG. 3 is a graph illustrating a relation between an elapsed time in a demand time limit and an integrated power consumption in order to indicate the amount of reduction in an estimated value of the integrated power consumption.

With reference to FIG. 3, a description is given of the amount of reduction in the estimated value of the integrated power consumption considering such a response time. In FIG. 3, a slope of a straight line, which indicates a relation between the elapsed time in the demand time limit and the integrated power consumption, corresponds to power consumption. Thus, a reduction in power consumption of a load device following the corresponding response time results in a reduction in the amount of increase in the integrated power consumption after the end of the response time. (Refer to a decrease in the slope.) An integrated value of the respective amounts of reduction in power consumption (i.e., the "amount of reduction of first load device", the "amount of reduction of second load device", and the "amount of reduction of third load device") from the ends of the corresponding response times to the expiration of the demand time limit determines the amount of reduction in the estimated value of the integrated power consumption.

According to the sum of the amounts of reduction calculated as above, the controller 17 selects one or more of the at least one load device 23 whose settings are to be changed along with the changes in the settings to be made so that the estimated value of the integrated power consumption is reduced to below the planned value. For example, in the figure, the estimated value of the integrated power consumption may be reduced to below the planned value at the expiration of the demand time limit by making predetermined changes in the settings of the first load device 23, the second load device 23, and the third load device 23. The controller 17 then generates the control instructions corresponding to the selected changes in the settings and stores the generated control instructions in the control queue 18.

The memory 19 included in the EMS server 14 stores, for each change in the setting of each load device 23, a set of the estimated value of power consumption in response to the change in the setting and the response time required for the expected value to be reached. The controller 17 retrieves the set of the estimated values and the response times from the memory 19 in order to calculate the amounts of reduction in the estimated value of the integrated power consumption that is to be caused by the aforementioned changes in the settings.

Figure 4:
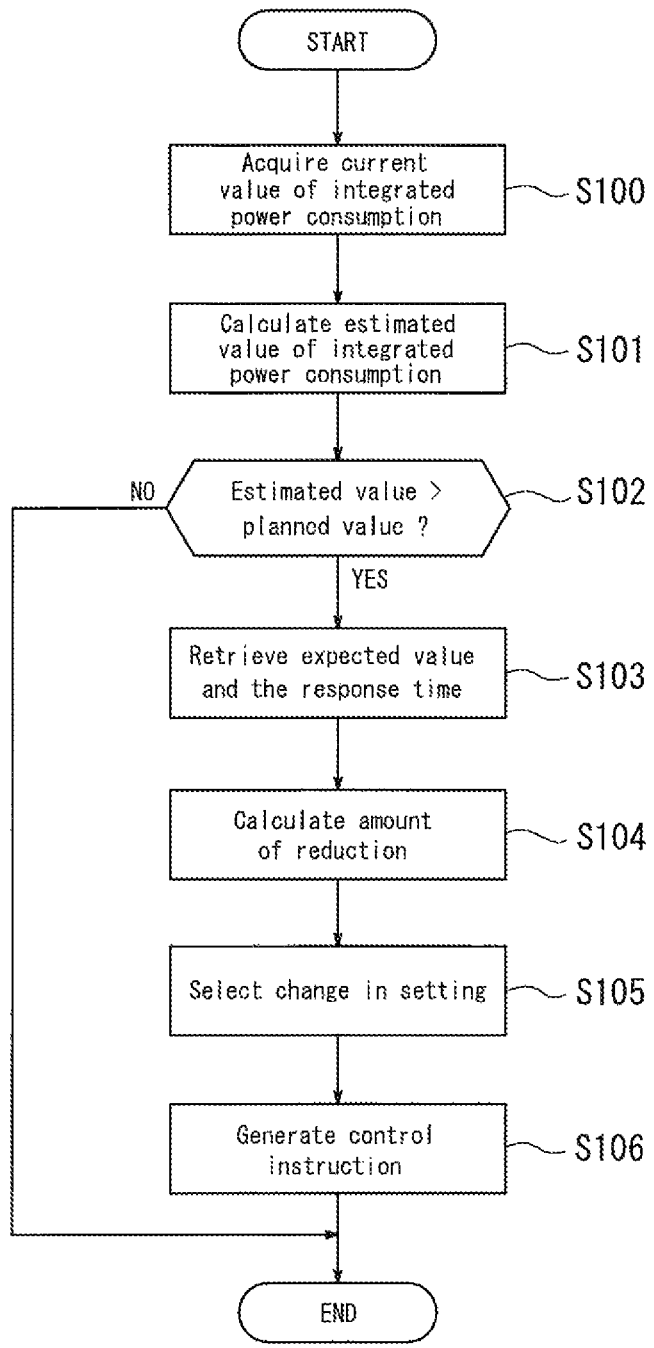
FIG. 4 is a flowchart illustrating processing of a controller to reduce the integrated power consumption according to the first embodiment.

Now, with reference to a flowchart of FIG. 4, a description is given of processing of the controller 17 to reduce the integrated power consumption according to the first embodiment. The controller 17 starts the processing of reducing the integrated power consumption at a predetermined time in every demand time limit.

In Step S100, the controller 17 acquires from the data collector 16 the current value of the integrated power consumption, that is to say, the integrated power consumption most recently acquired from the power control apparatus 12. Upon the acquisition of the current value, processing moves to Step S101.

In Step S101, based on the current value of the integrated power consumption acquired in Step S100, the controller 17 calculates the estimated value of the integrated power consumption at the expiration of the demand time limit. Upon the calculation of the estimated value, processing moves to Step S102.

In Step S102, the controller 17 determines whether the estimated value calculated in Step S101 is greater than the planned value. When the estimated value is greater than the planned value, processing moves to Step S103. When the estimated value is less than or equal to the planned value, the processing of reducing the integrated power consumption is ended.

In Step S103, the controller 17 retrieves, for each change in the setting of each load device 23, the expected value of power consumption in response to the change in the setting and the corresponding response time from the memory 19. Upon the retrieval of the expected values and the response times, processing moves to Step S104.

In Step S104, based on the expected values and the response times retrieved in Step S103, the controller 17 calculates the amounts of reduction in the integrated power consumption that is to be caused before the expiration of the demand time limit in response to the changes in the settings. Upon the calculation of the amounts of reduction, processing moves to Step S105.

In Step S105, from the sets of the amounts of reduction in response to a variety of changes in the settings of different load devices 23 as calculated in Step S104, the controller 17 selects one or more of the changes in the settings that are to reduce the estimated value calculated in Step S101 to below the planned value. Upon the selection of the changes in the settings, processing moves to Step S106.

In Step S106, the controller 17 generates the control instructions corresponding to the changes in the settings selected in Step S105 and stores the generated control instructions in the control queue 18. Upon the storage of the control instructions, the processing of reducing the integrated power consumption is ended.

The EMS server of the first embodiment with the aforementioned configuration is capable of controlling the load device 23 to regulate the mean value of power consumption per demand time limit below the planned value. As described above, the user of the power control system is allowed to consume the amount of power that is below the contract demand agreed with the power supplier. In other words, the user is allowed to use power as long as the integrated power consumption at the expiration of the demand time limit is below the amount of power corresponding to the product of the contract demand and the demand time limit period. The EMS server of the present embodiment reduces the mean value of power consumption per demand time limit to below the contract demand by setting the amount of power corresponding to the product of the contract demand and the demand time limit period to be the planned value.

Next, the second embodiment of the present invention is described. The second embodiment differs from the first embodiment in terms of the ways of changing the settings of the load devices 23. The description of the second embodiment below focuses on the differences from the first embodiment. Components with functions and configurations that are the same as those in the first embodiment are denoted with identical reference signs.

The configurations and functions of the power control apparatus 12 and the user terminal 13 in the second embodiment are the same as those in the first embodiment. The configurations and functions of the first sensor 20, the sensor manager 21, the second sensor 22, the third sensor 26, and the at last one load device 23 belonging to any one of the plurality of LANs 15 in the second embodiment are also the same as those in the first embodiment.

The configuration and function of the EMS server 14 in the second embodiment is the same as the first embodiment except for how the EMS server 14 changes the settings of the load devices 23. In the following, a description is given of how the EMS server 14 changes the settings of the load devices 23 in the second embodiment.

Similarly to the first embodiment, the controller 17 calculates the estimated value of the integrated power consumption at the expiration of the demand time limit, based on the current time and based on the current value of the integrated power consumption of the at least load device 23 under control of an arbitrary one of the power control apparatus 12. Unlike the first embodiment, the controller 17 calculates, for each load device 23, the estimated value at a predetermined interval or every time when the current value of the integrated power consumption stored in the data collector 16 is updated.

Unlike the first embodiment, each load device 23 has a predetermined threshold value, and the controller 17 compares the estimated value of each load device 23 with the corresponding threshold value. When the estimated value is greater than the threshold value, the controller 17 changes the setting of the load device 23. As a difference between the estimated value and the threshold value increases, the controller 17 changes the setting to provide a greater effect of reducing power consumption.

The threshold value is determined depending on the response time required for the expected value of power consumption expected to be reduced in response to the change in the setting. The longer the response time is, the smaller the threshold value becomes. The memory 19 stores the threshold value of each load device 23 in association with the predetermined response time. The controller 17 retrieves the stored threshold value on each calculation of the estimated value.

Upon the change in the setting, the controller 17 detects an actual response time required before power consumption of the load device 23 starts to be reduced, based on the updated integrated power consumption in the data collector 16. The controller 17 compares the actual response time with the response time stored in the memory 19. In accordance with a difference between the actual response time and the predetermined response time, the controller 17 adjusts the corresponding threshold value stored in the memory 19. For example, when the actual response time is longer than the response time stored in the memory 19, the controller 17 adjusts the threshold value stored in the memory 19 to be smaller.

Figure 5:
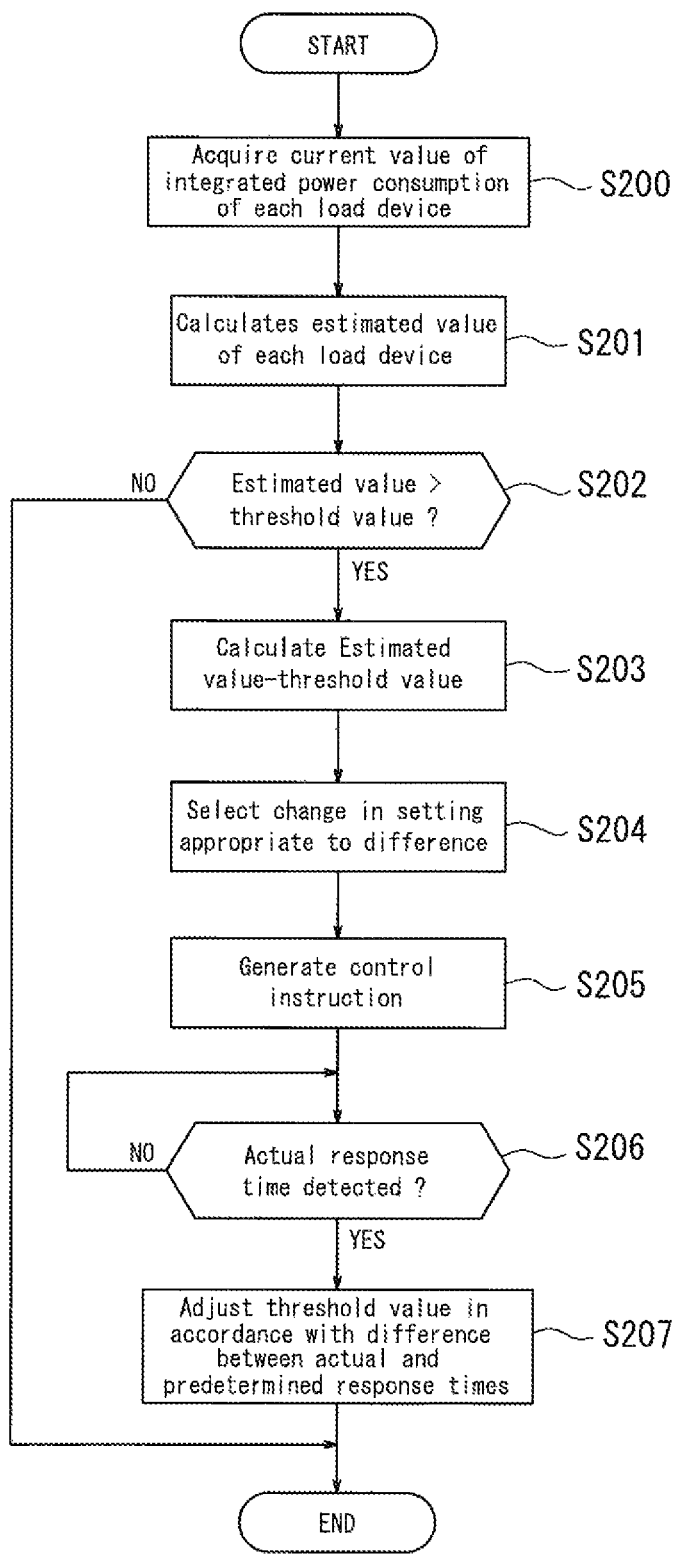
FIG. 5 is a flowchart illustrating processing of a controller to reduce the integrated power consumption according to a second embodiment.

Next, with reference to a flowchart of FIG. 5, a description is given of the processing of the controller 17 to reduce the integrated power consumption according to the second embodiment. The controller 17 starts the processing of reducing the integrated power consumption at a predetermined interval in the demand time limit.

In Step S200, the controller 17 acquires from the data collector 16 the current value of the integrated power consumption of each load device 23, that is to say, the integrated power consumption of each load device 23 most recently acquired from the arbitrary one of the power control apparatus 12. After the acquisition of the current values, processing moves to Step S201.

In Step S201, based on the current values of the integrated power consumptions acquired in Step S200, the controller 17 calculates, for each load device 23, the estimated value of the integrated power consumption at the expiration of the demand time limit. After the calculation of the estimated values, processing moves to Step S202.

In Step S202, the controller 17 determines whether the estimated value of each load device 23 calculated in Step S201 is greater than the threshold value that is predetermined for the load device 23. When the estimated value of any of the at least one load device 23 is greater than the corresponding threshold value, processing moves to Step S203. When the estimated value of each load device 23 is less than or equal to the corresponding threshold value, the processing of reducing the integrated power consumption is ended.

In Step S203, the controller 17 calculates a difference between the estimated value and the threshold value of the any of the at least one load device 23. After the calculation of the difference, processing moves to Step S204.

In Step S204, the controller 17 selects a change in the setting appropriate to the difference calculated in Step S203. When there is only a single available change in the setting for reducing the integrated power consumption, the controller 17 selects that change in the setting. Upon the selection of the change in the setting, processing moves to Step S205.

In Step S205, the controller 17 generates the control instruction corresponding to the change in the setting selected in Step S204 and stores the generated control instruction in the control queue 18. Upon storage in the control queue 18, processing moves to Step S206.

In Step S206, the controller 17 determines whether the time required before the actual power consumption of the any of the at least one load device 23 starts to change in response to the change in the setting, namely, the response time, has been detected. When the response time has not been detected, Step S206 is repeated as standby processing until the response time is detected. Upon the detection of the response time, processing moves to Step S207.

In Step S207, in accordance with a difference between the actual response time detected in Step S206 and the response time stored in the memory 19, the controller 17 adjusts the threshold value and updates the threshold value stored in the memory 19. Upon the adjustment of the threshold value, the processing of reducing the integrated power consumption is ended.

The EMS server of the second embodiment with the aforementioned configuration sets the threshold value appropriately and is thereby also capable of controlling the load device 23 to regulate the mean value of power consumption per demand time limit below the planned value. Accordingly, similarly to the first embodiment, the EMS server of the present embodiment reduces the mean value of power consumption per demand time limit to below the contract demand by setting the amount of power corresponding to the product of the contract demand and the demand time limit period to be the planned value.

Furthermore, since the second embodiment reduces the integrated power consumption by a simplified method, which differs from the configuration of the first embodiment in which the expected value of power consumption is calculated for each change in the setting, the second embodiment reduces load on the EMS server 14.

Moreover, the second embodiment allows the controller 17 to change a setting to provide a greater effect of reducing power consumption as a difference between the estimated value and the threshold value increases. This configuration further ensures the reduction of the mean value of power consumption per demand time limit to below the planned value even when the estimated value is relatively large.

Moreover, the second embodiment allows the controller 17 to adjust a threshold value in accordance with a difference between the actual response time in response to the change in the setting and the response time stored in the memory 19. This configuration allows the controller 17 to change the setting of any load device 23 at a time appropriate to the actual response time.

Although the present invention has been described based on the drawings and the embodiments thereof, it should be noted that a person skilled in the art may easily make various changes and modifications according to the present disclosure. Therefore, such changes and modifications are to be understood as included within the scope of the present invention.

For example, although in the first and the second embodiment the EMS server 14 is configured to perform the processing of reducing the integrated power consumption, the power control apparatus 12 may perform the processing of reducing the integrated power consumption.

REFERENCE SIGNS

10 Power control system
11 Internet
12 Power control apparatus
13 User terminal
14 Energy management system (EMS) server
15 Local area network (LAN)
16 Data collector
17 Controller
18 Control queue
19 Memory
20 First sensor
21 Sensor manager
22 Second sensor
23 Load device
24 Demand monitoring device
25 Power meter
26 Third sensor

The invention claimed is:

1. A server apparatus configured to control at least one load device located in a consumer's facility in accordance with (i) an estimated value of an integrated power consumption at an expiration of a reference time that the consumer and an electric company use in calculation of power charges, the estimated value of the integrated power consumption being calculated based on a current value of power consumption of the at least one load device and a remaining time in the reference time, and (ii) a response time required to complete a change in power consumption of the at least one load device in response to a change in a setting of the at least one load device,
    wherein the at least one load device comprises a plurality of load devices each having a predetermined response time, wherein each of the plurality of load devices is associated with a predetermined threshold value that depends on the predetermined response time for that load device, and
    wherein the server apparatus is further configured to, when the estimated value of any of the plurality of load devices is greater than the corresponding predetermined threshold value, generate a control instruction to reduce power consumption of the any of the plurality of load devices.

2. The server apparatus of claim 1, wherein the server is further configured to:
    calculate, for each of the plurality of load devices, an amount of reduction in the estimated value at the expiration of the reference time that is caused by the change in the setting of the load device, based on the remaining time in the reference time and the response time; and
    generate at least one control instruction to make the change in the setting of at least one of the plurality of the load devices for reducing the estimated value to below a planned value.

3. The server apparatus of claim 2, wherein the at least one control instruction comprises a plurality of control instructions generated for at least some of the plurality of load devices, and the server apparatus is further configured to generate a set of the plurality of control instructions and the at least some of the plurality of load devices for reducing the estimated value to below the planned value.

4. The server apparatus of claim 1, wherein, as a difference between the estimated value and the threshold value increases, the server apparatus generates the control instruction providing a greater effect of reducing power consumption.

5. The server apparatus of claim 4, further configured to store an actual response time required to complete the change in power consumption of the any of the plurality of load devices after the change in the setting is made to the any of the plurality of load devices in response to the control instruction and to adjust the threshold value in accordance with a difference between the actual response time and the predetermined response time.

6. The server apparatus of claim 1, further configured to store an actual response time required to complete the change in power consumption of the any of the plurality of load devices after the change in the setting is made to the any of the plurality of load devices in response to the control instruction and to adjust the threshold value in accordance with a difference between the actual response time and the predetermined response time.

7. A power control apparatus configured to control at least one load device located in a consumer's facility in accordance with (i) an estimated value of an integrated power consumption at an expiration of a reference time that the consumer and an electric company use in calculation of power charges, the estimated value of the integrated power consumption being calculated based on a current value of power consumption of the at least one load device and a remaining time in the reference time, and (ii) a response time required to complete a change in power consumption of the at least one load device in response to a change in a setting of the at least one load device,
   wherein the at least one load device comprises a plurality of load devices each having a predetermined response time, wherein each of the plurality of load devices is associated with a predetermined threshold value that depends on the predetermined response time for that load device, and
   wherein the power control apparatus is further configured to, when the estimated value of any of the plurality of load devices is greater than the corresponding predetermined threshold value, generate a control instruction to reduce power consumption of the any of the plurality of load devices.

8. The power control apparatus of claim 7, further configured to (i) transmit, to a server, the current value of power consumption of the at least one load device, (ii) receives, from the server, a control instruction to the at least one load device generated in accordance with the estimated value, which is calculated based on the current value of power consumption of the at least one load device and the remaining time in the reference time, and the response time, which is required to complete the change in power consumption of the at least one load device in response to the change in the setting of the at least one load device, and (iii) control the at least one load device in accordance with the received control instruction.

9. A power control system, comprising:
   a power control apparatus configured to transmit a current value of power consumption of at least one load device located in a consumer's facility and configured to control the load device; and
   a server apparatus configured to generate a control instruction for controlling the at least one load device in accordance with (i) an estimated value of an integrated power consumption at an expiration of a reference time that the consumer and an electric company use in calculation of power charges, the estimated value of the integrated power consumption being calculated based on the current value of power consumption and a remaining time in the reference time, and (ii) a response time required to complete a change in power consumption of the at least one load device in response to a change in a setting of the at least one load device,
   wherein the power control apparatus receives the control instruction from the server apparatus and controls the at least one load device in accordance with the received control instruction,
   wherein the at least one load device comprises a plurality of load devices each having a predetermined response time, wherein each of the plurality of load devices is associated with a predetermined threshold value that depends on the predetermined response time for that load device, and
   wherein the server apparatus is further configured to, when the estimated value of any of the plurality of load devices is greater than the corresponding predetermined threshold value, generate a control instruction to reduce power consumption of the any of the plurality of load devices.

* * * * *